US008477297B2

(12) United States Patent
Kato

(10) Patent No.: US 8,477,297 B2
(45) Date of Patent: Jul. 2, 2013

(54) REFRACTIVE INDEX DISTRIBUTION MEASURING METHOD AND APPARATUS, AND METHOD OF PRODUCING OPTICAL ELEMENT THEREOF, THAT USE MULTIPLE TRANSMISSION WAVEFRONTS OF A TEST OBJECT IMMERSED IN AT LEAST ONE MEDIUM HAVING A DIFFERENT REFRACTIVE INDEX FROM THAT OF THE TEST OBJECT AND MULTIPLE REFERENCE TRANSMISSION WAVEFRONTS OF A REFERENCE OBJECT HAVING KNOWN SHAPE AND REFRACTIVE INDEX DISTRIBUTION

(75) Inventor: Seima Kato, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/305,827

(22) Filed: Nov. 29, 2011

(65) Prior Publication Data

US 2012/0139136 A1 Jun. 7, 2012

(30) Foreign Application Priority Data

Dec. 3, 2010 (JP) ................................. 2010-270214

(51) Int. Cl.
*G01N 21/41* (2006.01)
(52) U.S. Cl.
USPC ............................ 356/128; 356/124; 356/517
(58) Field of Classification Search
USPC ................. 356/73.1, 124–128, 131, 517, 130
See application file for complete search history.

(56) References Cited

U.S. PATENT DOCUMENTS

| 4,265,534 A | 5/1981 | Remijan |
| 4,541,697 A | 9/1985 | Remijan |
| 4,542,989 A | 9/1985 | Remijan |

(Continued)

FOREIGN PATENT DOCUMENTS

| JP | 58-045526 A | 3/1983 |
| JP | 61-070436 A | 4/1986 |

(Continued)

OTHER PUBLICATIONS

Takeda, Mitsuo et al. "Lateral aberration measurements with a digital Talbot interferometer," Applied Optics, vol. 23, No. 11, Jun. 1, 1984, pp. 1760-1764. Cited in related U.S. Appl. No. 12/728,878.

(Continued)

*Primary Examiner* — Tarifur Chowdhury
*Assistant Examiner* — Michael P LaPage
(74) *Attorney, Agent, or Firm* — Rossi, Kimms & McDowell LLP

(57) ABSTRACT

The method measures first transmitted wavefronts and second transmitted wavefronts by respectively causing reference light to enter an object placed in plural placement states in a first medium and a second medium, calculates an aberration sensitivity with respect to changes of the placement state of the object, and calculates an alignment error of the object in each placement state by using the aberration sensitivity and the first and second transmitted wavefronts measured in each placement state. The method further calculates first and second reference transmitted wavefronts respectively acquirable when causing the reference light to enter the reference object placed in placement states including the alignment errors in the first medium and the second medium, and calculates a refractive index distribution of the object which a shape component thereof is removed, by using the first and second transmitted wavefronts and the first and second reference transmitted wavefronts.

8 Claims, 5 Drawing Sheets

U.S. PATENT DOCUMENTS

| | | | |
|---|---|---|---|
| 4,565,449 | A | 1/1986 | Grego |
| 4,744,654 | A | 5/1988 | Jinno et al. |
| 4,934,818 | A * | 6/1990 | Glantschnig et al. ........ 356/73.1 |
| 5,151,752 | A * | 9/1992 | Oono et al. .................. 356/128 |
| 5,309,214 | A | 5/1994 | Hashimoto |
| 5,526,118 | A * | 6/1996 | Miyagawa et al. ........... 356/484 |
| 6,765,661 | B2 | 7/2004 | Biel et al. |
| 7,388,676 | B2 | 6/2008 | Sawada |
| 2006/0159332 | A1 | 7/2006 | Sawada |
| 2007/0109555 | A1 | 5/2007 | Gustafsson et al. |
| 2009/0109401 | A1* | 4/2009 | Van Heugten ................ 351/221 |
| 2009/0147241 | A1 | 6/2009 | Shlezinger et al. |
| 2010/0165355 | A1* | 7/2010 | Kato ............................ 356/517 |
| 2010/0245842 | A1 | 9/2010 | Kato |
| 2011/0134438 | A1 | 6/2011 | Kato |
| 2011/0292379 | A1 | 12/2011 | Kato |
| 2012/0139136 | A1 | 6/2012 | Kato |
| 2012/0241989 | A1 | 9/2012 | Sugimoto |

FOREIGN PATENT DOCUMENTS

| | | | |
|---|---|---|---|
| JP | 1-35282 | B2 | 7/1989 |
| JP | 1-316627 | A | 12/1989 |
| JP | 2-008726 | A | 1/1990 |
| JP | 03-128411 | A | 5/1991 |
| JP | 03-225259 | A | 10/1991 |
| JP | 08-014852 | A | 1/1996 |
| JP | 08-304229 | A | 11/1996 |
| JP | 11-044641 | A | 2/1999 |
| JP | 2005-106835 | A | 4/2005 |
| JP | 2005-201724 | A | 7/2005 |
| JP | 2006-200999 | A | 8/2006 |
| JP | 2010-151578 | A | 7/2010 |
| JP | 2010151578 | A | 7/2010 |

OTHER PUBLICATIONS

Takeda, Mitsuo et al. "Fourier-transform method of fringe-pattern analysis for computer-based topography and interferometry," Optical Society of America, Vo. 72, No. 1, Jan. 1982, pp. 156-160. Cited in related U.S. Appl. No. 12/728,878.

Korean Office Action for KR 10-2009-012038, dated Aug. 10, 2012. Cited in related U.S. Appl. No. 12/728,878.

International Search Report issued Aug. 30, 2011 for PCT/JP2011/062041 (cited in related US2012-0241989).

Ranjbar, et al., "Nondestructive Measurement of Refractive Index Profile of Optical Fiber Preforms Using Moire Technique and Phase Shift Method", Optical Communication, vol. 6025, 605250, 2006 (cited in related US2012-0241989).

\* cited by examiner

REFRACTIVE INDEX DISTRIBUTION MEASURING METHOD AND APPARATUS, AND METHOD OF PRODUCING OPTICAL ELEMENT THEREOF, THAT USE MULTIPLE TRANSMISSION WAVEFRONTS OF A TEST OBJECT IMMERSED IN AT LEAST ONE MEDIUM HAVING A DIFFERENT REFRACTIVE INDEX FROM THAT OF THE TEST OBJECT AND MULTIPLE REFERENCE TRANSMISSION WAVEFRONTS OF A REFERENCE OBJECT HAVING KNOWN SHAPE AND REFRACTIVE INDEX DISTRIBUTION

BACKGROUND OF THE INVENTION

1. Field of the Invention

The present invention relates to an apparatus and a method for measuring a refractive index distribution of an object such as an optical element.

2. Description of the Related Art

Optical elements such as lenses used in optical apparatuses such as digital cameras and laser beam printers require a high refractive index. Moreover, using a mold forming technique makes it easy to form a complex shape such as an aspheric surface from an optical glass and a plastic material having a high refractive index.

However, the molding forming technique may cause unevenness of the refractive index in the optical element depending on forming conditions. Such unevenness of the internal refractive index may provide significant influences on optical characteristics of the optical element, which makes it impossible to achieve desired optical characteristics. Thus, it is necessary to accurately measure optical homogeneity inside the optical element.

Japanese Patent Laid-Open No. 2010-151578 discloses a method of acquiring a refractive index distribution of an object by measuring transmitted wavefronts of the object in states where the object is soaked in two media having refractive indices different from each other and from that of the object. This measuring method enables highly accurate measurement of the internal refractive index distribution of the object when the object has a high refractive index, without using a medium having a refractive index approximately equal to that of the object.

The measuring method disclosed in Japanese Patent Laid-Open No. 2010-151578 requires accurate measurement of placement of the object such as tilt or decentering. However, when the object has a complex shape like an optical element such as a lens, it is difficult to accurately measure the placement of the object, which makes it difficult to accurately calculate the refractive index distribution of the object.

SUMMARY OF THE INVENTION

The present invention provides a refractive index distribution measuring method and a refractive index distribution measuring apparatus capable of accurately calculating the refractive index distribution of the object, without requiring highly accurate placement of the object in the medium, and provides a method of producing an optical element.

The present invention provides as an aspect thereof a refractive index distribution measuring method for measuring a refractive index distribution of an object by using a first medium having a first refractive index and a second medium having a second refractive index, the first and second refractive indices being different from each other and from a refractive index of the object. The method includes a transmitted wavefront measuring step of causing reference light to enter the object placed in the first medium to measure a first transmitted wavefront of the object, and of causing the reference light to enter the object placed in the second medium to measure a second transmitted wavefront of the object, a reference transmitted wavefront calculating step of calculating a first reference transmitted wavefront of a reference object acquirable when causing the reference light to enter the reference object placed in the first medium, the reference object having a known shape and a known refractive index distribution, and of calculating a second reference transmitted wavefront of the reference object acquirable when causing the reference light to enter the reference object placed in the second medium, and a refractive index distribution calculating step of calculating the refractive index distribution from which a shape component of the object is removed, by using the first and second transmitted wavefronts and the first and second reference transmitted wavefronts. The transmitted wavefront measuring step measures the first transmitted wavefronts by causing the reference light to enter the object placed in plural placement states in the first medium, and measures the second transmitted wavefronts by causing the reference light to enter the object placed in the plural placement states in the second medium. The method further includes an alignment error calculating step of calculating an aberration sensitivity with respect to changes of the placement state of the object, and of calculating an alignment error of the object in each of the plural placement states in the measurements of the first and second transmitted wavefronts, by using the aberration sensitivity and the first and second transmitted wavefronts measured in the plural placement states. The reference transmitted wavefront calculating step calculates the first and second reference transmitted wavefronts respectively acquirable when causing the reference light to enter the reference object placed in placement states including the alignment errors in the first medium and the second medium.

The present invention provides as another aspect thereof a refractive index distribution measuring apparatus configured to measure a refractive index distribution of an object by using a first medium having a first refractive index and a second medium having a second refractive index, the first and second refractive indices being different from each other and from that of the object. The apparatus includes a transmitted wavefront measuring part configured to cause reference light to enter the object placed in the first medium to measure a first transmitted wavefront of the object, and configured to cause the reference light to enter the object placed in the second medium to measure a second transmitted wavefront of the object, a reference transmitted wavefront calculating part configured to calculate a first reference transmitted wavefront of a reference object acquirable when causing the reference light to enter the reference object placed in the first medium, the reference object having a known shape and a known refractive index distribution, and configured to calculate a second reference transmitted wavefront of the reference object acquirable when causing the reference light to enter the reference object placed in the second medium, and a refractive index distribution calculating part configured to calculate the refractive index distribution from which a shape component of the object is removed, by using the first and second transmitted wavefronts and the first and second reference transmitted wavefronts. The transmitted wavefront measuring part is configured to measure the first transmitted wavefront by causing the reference light to enter the object placed in plural placement states in the first medium, and measures the second transmitted wavefront by causing the reference light to enter the object placed in the plural placement states in the second medium. The apparatus further comprises an alignment error calculating part configured to calculate an aberration sensitivity with respect to changes of the placement state of the object, and configured to calculate an alignment error of the object in each of the plural placement states in the measurements of the first and second transmitted wavefronts, by using the aberration sensitivity and the first and second transmitted wavefronts measured in the plural placement states. The reference transmitted wavefront calculating part is configured to calculate the first and second reference transmitted wavefronts respectively acquirable when causing the reference light to enter the reference object placed in placement states including the alignment errors in the first medium and the second medium.

The present invention provides as still another aspect thereof a refractive index distribution measuring method for measuring a refractive index distribution of an object by using a medium having a refractive index different from that of the object, and by using first reference light and second reference light having a wavelength different from that of the first reference light. The method includes a transmitted wavefront measuring step of causing the first reference light to enter the object placed in the medium to measure a first transmitted wavefront of the object, and of causing the second reference light to enter the object placed in the medium to measure a second transmitted wavefront of the object, a reference transmitted wavefront calculating step of calculating a first reference transmitted wavefront of a reference object acquirable when causing the first reference light to enter the reference object placed in the medium, the reference object having a known shape and a known refractive index distribution, and of calculating a second reference transmitted wavefront of the reference object acquirable when causing the second reference light to enter the reference object placed in the medium, and a refractive index distribution calculating step of calculating the refractive index distribution from which a shape component of the object is removed, by using the first and second transmitted wavefronts and the first and second reference transmitted wavefronts. The transmitted wavefront measuring step measures the first transmitted wavefront by causing the first reference light to enter the object placed in plural placement states in the medium, and measures the second transmitted wavefront by causing the second reference light to enter the object in the plural placement states. The method further includes an alignment error calculating step of calculating an aberration sensitivity with respect to changes of the placement state of the object, and of calculating an alignment error of the object in each of the plural placement states in the measurements of the first and second transmitted wavefronts, by using the aberration sensitivity and the first and second transmitted wavefronts measured in the plural placement states. The reference transmitted wavefront calculating step calculates the first and second reference transmitted wavefronts respectively acquirable when causing the first reference light and the second reference light to enter the reference object placed in placement states including the alignment errors.

The present invention provides as yet still another aspect thereof a refractive index distribution measuring apparatus configured to measure a refractive index distribution of an object by using a medium having a refractive index different from that of the object, and by using first reference light and second reference light having a wavelength different from that of the first reference light. The apparatus includes a transmitted wavefront measuring part configured to cause the first reference light to enter the object placed in the medium to measure a first transmitted wavefront of the object, and configured to cause the second reference light to enter the object placed in the medium to measure a second transmitted wavefront of the object, a reference transmitted wavefront calculating part configured to calculate a first reference transmitted wavefront of a reference object acquirable when causing the first reference light to enter the reference object placed in the medium, the reference object having a known shape and a known refractive index distribution, and configured to calculate a second reference transmitted wavefront of the reference object acquirable when causing the second reference light to enter the reference object placed in the medium, and a refractive index distribution calculating part configured to calculate the refractive index distribution from which a shape component of the object is removed, by using the first and second transmitted wavefronts and the first and second reference transmitted wavefronts. The transmitted wavefront measuring part is configured to measure the first transmitted wavefront by causing the first reference light to enter the object placed in plural placement states in the medium, and configured to measure the second transmitted wavefront by causing the second reference light to enter the object placed in the plural placement states. The apparatus further comprises an alignment error calculating part configured to calculate an aberration sensitivity with respect to changes of the placement state of the object, and configured to calculate an alignment error of the object in each of the plural placement states in the measurements of the first and second transmitted wavefronts, by using the aberration sensitivity and the first and second transmitted wavefronts measured in the plural placement states. The reference transmitted wavefront calculating part is configured to calculate the first and second reference transmitted wavefronts respectively acquirable when causing the first reference light and the second reference light to enter the reference object placed in placement states including the alignment errors.

The present invention provides as further another aspect thereof a method of producing an optical element including a step of performing a mold forming of an optical element and a step of measuring a refractive index distribution of the optical element, which is an object, with the above-described refractive index distribution measuring method, and evaluating the optical element by using the measured refractive index distribution.

Further features of the present invention will become apparent from the following description of exemplary embodiments (with reference to the attached drawings).

DESCRIPTION OF THE PREFERRED EMBODIMENTS

Exemplary embodiments of the present invention will hereinafter be described with reference to the accompanying drawings.

Embodiment 1

Figure 1:
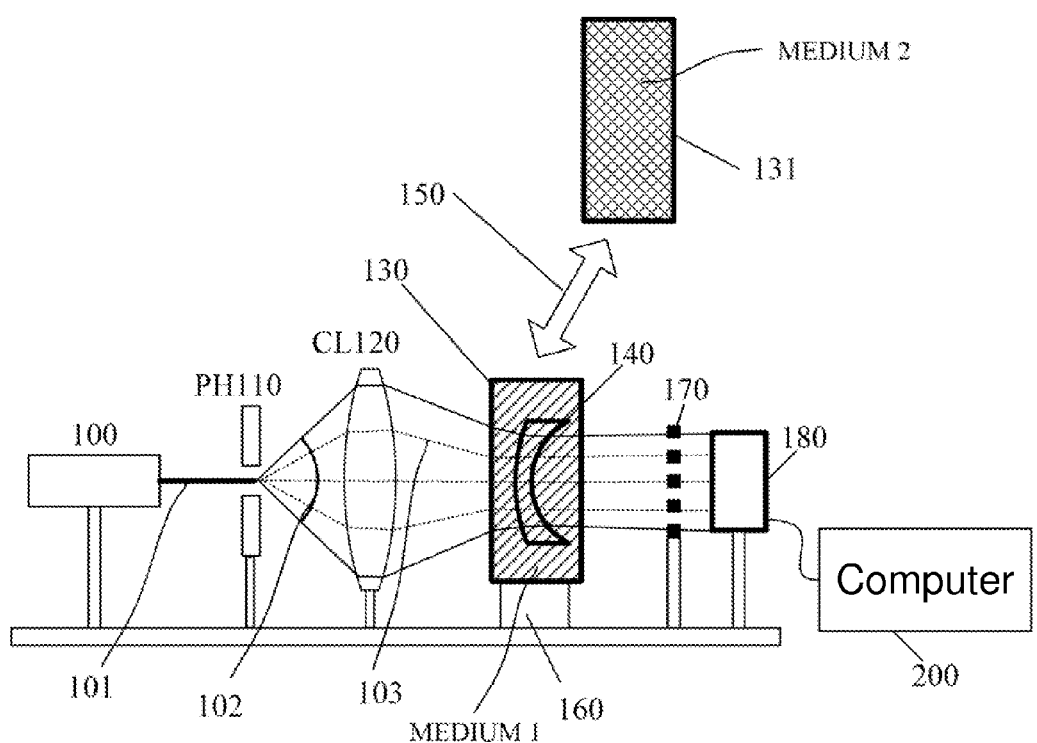
FIG. 1 shows the configuration of a refractive index distribution measuring apparatus that is Embodiment 1 of the present invention.

FIG. 1 shows the configuration of a refractive index measuring apparatus that is a first embodiment (Embodiment 1) of the present invention. This refractive index measuring apparatus measures (calculates) an internal refractive index distribution (hereinafter also simply referred to as "a refractive index distribution") of an object 140 that is an optical element such as a lens.

The apparatus causes reference light emitted from a laser light source 100 to enter the object 140 in states where the object 140 is soaked in two media (a first medium such as water and a second medium such as oil) having refractive indices different from each other and from that of the object, to measure a transmitted wavefront of the object 140. Then, a calculating part 200 constituted by a computer calculates the refractive index distribution of the object 140 by using the measured transmitted wavefronts. This embodiment uses a Talbot interferometer as a wavefront sensor to measure the transmitted wavefront of the object 140.

A liquid tank (object case) 130 is filled with the first medium such as water (shown as Medium 1 in FIG. 1), and a liquid tank 131 is filled with the second medium such as oil (shown as Medium 2 in FIG. 1). These liquid tanks 130 and 131 are interchangeably installed to an installation position in a measurement optical path, which will be described later, by a liquid tank interchanging mechanism 150.

The refractive indices of the first medium and the second medium are different from that of the object 140. It is desirable that the refractive indices of the first medium and the second medium be smaller than that of the object 140 by 0.01 or more. Moreover, the refractive index of the second medium is different from that of the first medium. It is desirable that the refractive index of the second medium be different from that of the first medium by 0.01 or more.

Laser light 101 emitted from a laser light source 100 (for example, a He—Ne laser) along an optical axis is diffracted when passing through a pinhole 110. The diffracted light 102 generated at the pinhole 110 is converted into convergent light 103 as reference light by a collimator lens (CL) 120. When the liquid tank 130 is installed to the installation position, the convergent light 103 is transmitted through the first medium in the liquid tank 130 and the object 140 soaked in the first medium.

In this embodiment, the object 140 is a lens having a shape rotationally symmetric with respect to its optical axis. A diameter ϕ of the pinhole 110 is designed to be small so as to enable the diffracted light 102 to be regarded as an ideal spherical wave, and designed so as to satisfy the following expression where NAO represents an object side numerical aperture and λ represents a wavelength of the laser light source 100:

$$\phi \approx \frac{\lambda}{NAO} \tag{1}$$

From this expression, when the wavelength λ is 600 nm and the object side numerical aperture NAO is about 0.3, the diameter ϕ of the pinhole 110 becomes about 2 μm.

The laser light transmitted through the object 140 and the first medium in the liquid tank 130 passes through an orthogonal diffraction grating 170 that is a two-dimensional diffraction grating, and then reaches a CCD sensor 180 that is a detector. An optical path from the laser light source 100 to the CCD sensor 180 is referred to as "a measurement optical path". Moreover, the pinhole 110, the collimator lens 120, the liquid tank 130, the orthogonal diffraction grating 170 and the CCD sensor 180 are hereinafter collectively referred to as "measuring optical elements".

When an image side numerical aperture of the object 140 is small and a distance Z between the orthogonal diffraction grating 170 and the CCD sensor 180 satisfies a Talbot condition that is expressed by the following expression (2), a self-image (Talbot image) of the diffraction grating 170 is formed as interference fringes on the CCD sensor 180. The interference fringes are captured by the CCD sensor 180.

$$\frac{Z_0 Z}{Z_0 - Z} = \frac{md^2}{\lambda} \tag{2}$$

The distance Z between the orthogonal diffraction grating 170 and the CCD sensor 180 is also called "a Talbot distance", m represents an integer other than 0, and d represents a grating pitch of the orthogonal diffraction grating 170. $Z_0$ represents a distance from the orthogonal diffraction grating 170 to an image surface of the object 140. For example, when the light exiting from the object 140 is collimated light (parallel light), the distance $Z_0$ becomes infinite. The grating pitch d of the orthogonal diffraction grating 170 is set depending on an amount of aberration of the object 140.

The object 140 is movable in a direction of the optical axis (optical axis direction) and a direction orthogonal to the optical axis direction by a parallel decentering mechanism 160. The collimator lens 120, the orthogonal diffraction grating 170 and the CCD sensor 180 are independently movable on a rail (not shown) extending in the optical axis direction.

Figure 2:
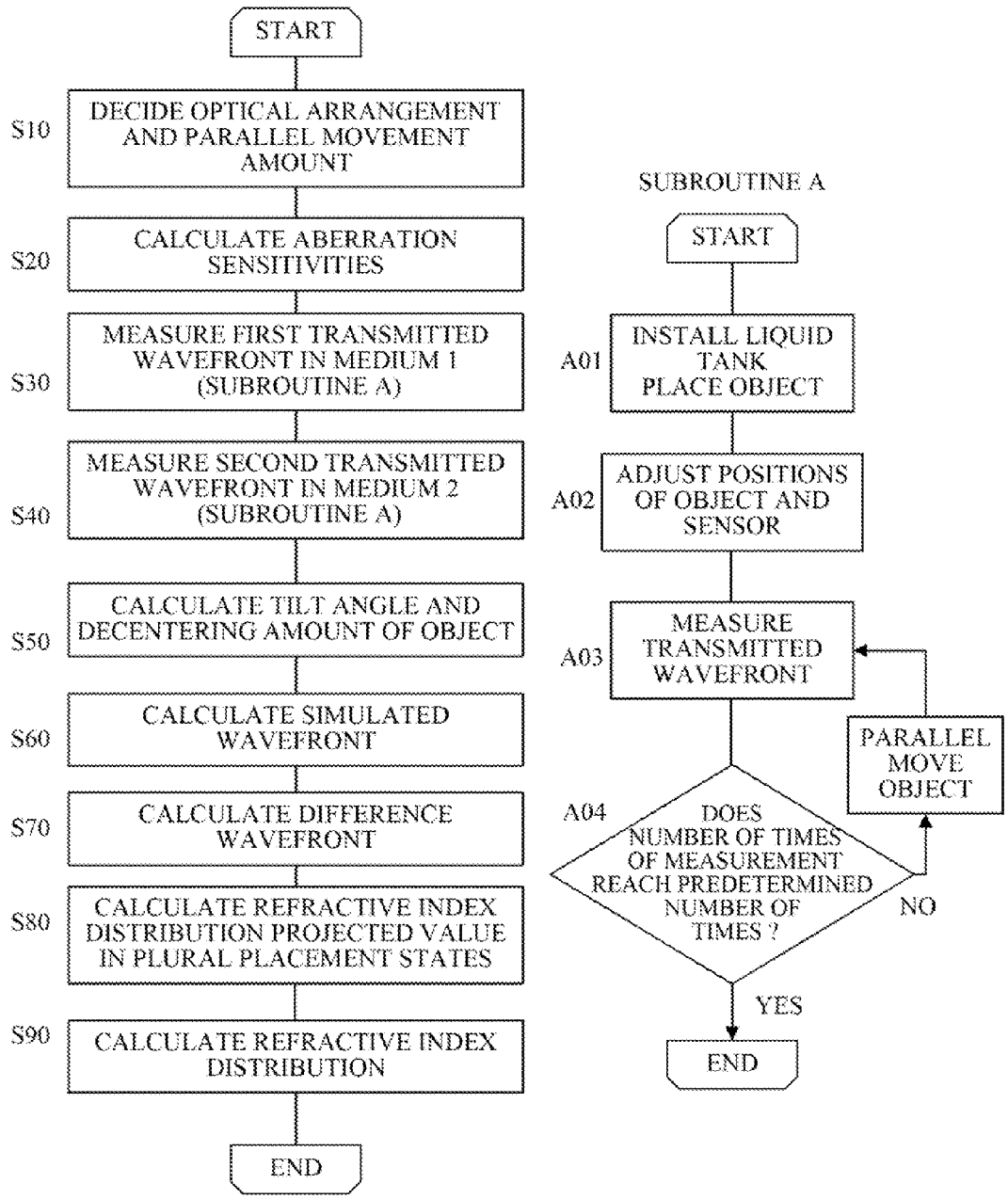
FIG. 2 is a flowchart showing an internal refractive index distribution measuring procedure in Embodiment 1.

FIG. 2 shows a procedure for measuring (calculating) the refractive index distribution of the object 140 (that is, a refractive index distribution measuring method) by using an image captured by the CCD sensor 180. This measuring procedure is executed by a calculating part 200 shown in FIG. 1 according to a computer program. The calculating part 200 serves as a transmitted wavefront measuring part, a reference transmitted wavefront calculating part, an alignment error calculating part and a refractive index distribution calculating part. In the following description, water is used as the first medium and oil is used as the second medium.

Firstly, at step S10, the calculating part 200 decides optical arrangements respectively appropriate for the measurement using the water (liquid tank 130) as the medium and for the measurement using the oil (liquid tank 131) as the medium, and decides parallel movement amount of the object 140 for plural measurements described later. The optical arrangement means distances (intervals) in the optical axis direction among the measuring optical elements that are the pinhole 110, the collimator lens 120, the liquid tank 130 (or 131), the orthogonal diffraction grating 170 and the CCD sensor 180.

In order to acquire the self-image of the orthogonal diffraction grating 170 on the entire image pickup surface of the CCD sensor 180 in the Talbot interferometer, it is necessary to reduce the numerical aperture (NA) to about 0.3 or less. Therefore, it is necessary to decide the optical arrangement such that the NA of a light flux reaching the CCD sensor 180 may be about 0.3 or less, and a size of the light flux on the CCD sensor 180 may become appropriate. Moreover, in order to correlate positions on the CCD sensor 180 to positions on the object 140 in a subsequent process, it is also important to decide the optical arrangement such that light rays that have passed through different positions on the object 140 may not overlap each other on the CCD sensor 180.

The parallel movement amount of the object 140 for the plural measurements is a movement amount in the direction orthogonal to the optical axis of the object 140, which is necessary for the measurement to an end of an effective diameter of the object 140 when it is impossible to perform the measurement for 100% of the effective diameter by a single measurement. In this embodiment, the decided parallel movement amount of the object 140 is represented by S. This embodiment performs, in each of the cases where the water and the oil are used as the medium, five measurements including one measurement to be performed in a placement state before the parallel movement of the object 140 and four measurements to be respectively performed in placement states after the parallel movements of the object 140 in four directions orthogonal to the optical axis.

Next, at step S20, the calculating part 200 calculates aberration sensitivities with respect to changes of the placement state (tilt and decentering) of the object 140 in each of the cases where the water and the oil are used as the medium in the optical arrangement decided at step S10. The aberration sensitivity is shown by a numerical value that expresses how much the transmitted wavelength is changed on the CCD sensor 180 in response to the tilt of the object 140 by a unit tilt angle (for example, 0.1°) and in response to the decentering thereof by a unit decentering amount (for example, 0.1 mm). Although the object 140 essentially should be placed in a reference placement state where the object 140 is not tilted and decentered, actual placement states of the object include alignment errors such as the tilt and the decentering with respect to the reference placement state.

The tilt and the decentering (parallel displacement) in this embodiment are alignment errors with respect to axes orthogonal to the optical axis. Two axes orthogonal to the optical axis and orthogonal to each other are defined as an x-axis and a y-axis, and tilt angles with respect to the x- and y-axes are respectively represented by θx and θy. Decentering amounts in directions of the x- and y-axes are respectively represented by x and y. The above-mentioned reference placement state is a state where θx, θy, x and y are zero.

Since this embodiment performs the five measurements for each of the two media, the calculating part 200 calculates the aberration sensitivities for the tilt angles θx and θy and the decentering amounts x and y in 10 (=2×5) placement states. When a wavefront aberration in each placement state is expressed by U (U1, U2, . . . , and U10), the aberration sensitivity is expressed by the following expression (3):

$$\text{Aberration sensitivity} = \begin{pmatrix} \frac{\partial U1}{\partial x} & \frac{\partial U1}{\partial y} & \frac{\partial U1}{\partial \theta x} & \frac{\partial U1}{\partial \theta y} \\ \frac{\partial U2}{\partial x} & \frac{\partial U2}{\partial y} & \frac{\partial U2}{\partial \theta x} & \frac{\partial U2}{\partial \theta y} \\ \vdots & \vdots & \vdots & \vdots \\ \frac{\partial U10}{\partial x} & \frac{\partial U10}{\partial y} & \frac{\partial U10}{\partial \theta x} & \frac{\partial U10}{\partial \theta y} \end{pmatrix} \quad (3)$$

Next, at steps S30 and S40 (transmitted wavefront measuring step), the calculating part 200 measures the transmitted wavefront of the object 140 in each of the cases where the water and the oil are used as the medium according to the following subroutine A.

Since the subroutine A is a process to be performed in both the cases where the water and the oil are used as the medium, the subroutine A to be performed in the case where the water is used as the medium will hereinafter be described as an example. The subroutine A includes the following four steps A01 to A04.

Firstly, at step A01, the calculating part 200 drives the liquid tank interchanging mechanism 150 shown in FIG. 1 to install the liquid tank 130 filled with the water into the measurement optical path, and then inserts the object 140 into the liquid tank 130 (that is, into the water).

Next, at step A02, the calculating part 200 arranges the measuring optical elements at positions corresponding to the optical arrangement for the case where the water is used as the medium, which has been decided at step S10. In this arrangement, the object 140 is moved by the parallel decentering mechanism 160, and the orthogonal diffraction grating 170 and the CCD sensor 180 are moved along the rail (not shown).

FIG. 1 shows a concave lens having a negative optical power as an example of the object 140. When the object 140 is a convex lens having a positive optical power, placing the object 140 on a rear side further than a light converging point formed by the collimator lens 120 (that is, closer to the orthogonal diffraction grating 170 than the light converging point) makes it possible to appropriately set the size of the light flux on the CCD sensor 180.

Next, at step A03, the calculating part 200 measures the transmitted wavefront (first transmitted wavefront) of the object 140 through the Talbot interferometer shown in FIG. 1 in the state where the object 140 is soaked in the water. This step includes acquisition of an image of the interference fringes through the CCD sensor 180 and wavefront retrieval of the transmitted wavefront. The wavefront retrieval of the transmitted wavefront (hereinafter referred to as "wavefront restration") is performed by an FFT (Fast Fourier Transform) method. The wavefront retrieval by the FFT method separates carrier fringes from aberration by utilizing a characteristic of the aberration which disarranges the carrier fringes of the interference fringes.

Specifically, two dimensionally performing the FFT on the interference fringes converts the interference fringes into a frequency map. Next, only an area near a carrier frequency is clipped out from the frequency map, coordinate transformation is performed on the clipped area such that the career frequency may become an origin, and then iFFT (inverse-Fast Fourier Transform) is performed thereon. This process enables acquisition of a phase term (phase map) of a complex amplitude map, and the phase map corresponds to the transmitted wavefront. At step A03 performed in step S40, the calculating part 200 measures the transmitted wavefront (second transmitted wavefront) of the object 140 in the state where the object 140 is soaked in the oil.

Next, at step A04, the calculating part 200 drives the parallel decentering mechanism 160 to move the object 140 in the four directions orthogonal to the optical axis by S (that is, to four placement states) until the number of times of the measurements reaches a predetermined number of times (five times in this embodiment). The calculating part 200 measures the transmitted wavefront of the object 140 after the movement to each of the four placement states.

As described above, at steps S30 and S40, the transmitted wavefronts of the object 140 in the five placement states in each of the mutually different media (water and oil) are acquired. The ten transmitted wavefronts in total thus acquired are shown by Wm1, Wm2, . . . , and Wm10.

At next step S50 (alignment error calculating step), the calculating part 200 calculates, from the aberration sensitivities and the measured transmitted wavefronts, the tilt angle and the decentering amount of the object 140 with respect to the reference placement state. Description will be made of the tilt angle and the decentering amount of the object 140.

Firstly, the tilt angles of the object 140 with respect to the x- and y-axes are respectively represented by $\Delta\theta x$ and $\Delta\theta y$, and the decentering amounts thereof in the x- and y-axis directions are respectively represented be $\Delta x$ and $\Delta y$. These tilt angles $\Delta\theta x$ and $\Delta\theta y$ and the decentering amounts $\Delta x$ and $\Delta y$ correspond to the alignment errors of the object 140 with respect to the reference placement state. An influence $\Delta U$ of the alignment error of the object 140 in each measurement is expressed by the following expression (4):

$$\begin{pmatrix} \Delta U1 \\ \Delta U2 \\ \vdots \\ \Delta U10 \end{pmatrix} = \begin{pmatrix} \frac{\partial U1}{\partial x} & \frac{\partial U1}{\partial y} & \frac{\partial U1}{\partial \theta x} & \frac{\partial U1}{\partial \theta y} \\ \frac{\partial U2}{\partial x} & \frac{\partial U2}{\partial y} & \frac{\partial U2}{\partial \theta x} & \frac{\partial U2}{\partial \theta y} \\ \vdots & \vdots & \vdots & \vdots \\ \frac{\partial U10}{\partial x} & \frac{\partial U10}{\partial y} & \frac{\partial U10}{\partial \theta x} & \frac{\partial U10}{\partial \theta y} \end{pmatrix} \begin{pmatrix} \Delta x \\ \Delta y \\ \Delta \theta x \\ \Delta \theta y \end{pmatrix} \quad (4)$$

Moreover, the measured transmitted wavefronts Wm1 to Wm10 are expressed by the following expression (5):

$$Wm1 = U1 + \Delta U1 \quad (5)$$
$$Wm2 = U2 + \Delta U2$$
$$\vdots$$
$$Wm10 = U10 + \Delta U10$$

When defining $\psi$ as shown by the following expression (6), the alignment errors $\Delta\theta x$, $\Delta\theta y$, $\Delta x$ and $\Delta y$ are decided so as to minimize $\psi$.

$$\psi = \begin{pmatrix} Wm1 - \Delta U1 \\ Wm2 - \Delta U2 \\ \vdots \\ Wm10 - \Delta U10 \end{pmatrix} \quad (6)$$

Methods for deciding the alignment errors so as to minimize $\psi$ include a least-square method and an eigenvalue decomposition method. The methods will be described in detail later.

A solution of the alignment errors acquired by the above-mentioned method minimizes the value of the transmitted wavefront. That is, the alignment errors of the object 140 in this embodiment show change amounts of the tilt angle and the decentering amount of the object 140 which minimize the value of the transmitted wavefront in the placement state of the object 140 where the aberration sensitivities have been calculated at step S20. When two or more local minimum values of the transmitted wavefront exist, any one of them may be employed, but the smallest minimum value of them is most desirable.

Moreover, it is generally impossible to acquire the alignment errors of the object separately from a shape component and a refractive index distribution component of the object 140. However, this embodiment calculates a solution that simultaneously minimizes the transmitted wavefront measured when the medium is the water and the transmitted wavefront measured when the medium is the oil, which enables calculation of the alignment errors of the object 140 without receiving influences of the shape component and the refractive index distribution component of the object 140.

Next, at step S60 (reference transmitted wavefront calculating step), the calculating part 200 calculates transmitted wavefronts acquirable through the CCD sensor 180 in the cases where the water and the oil are used as the medium, by using the alignment errors (tilt and decentering) calculated at step S50 and a known refractive index distribution. Specifically, the calculating part 200 calculates simulated wavefronts $W_{sim}$ as reference transmitted wavefronts by computer simulation.

That is, the calculating part 200 calculates the simulated wavefronts $W_{sim}$ corresponding to transmitted wavefronts acquirable when an object whose refractive index distribution is known is placed in the same plural placement states as those of the object 140 in the measurements at steps S30 and S40 (that is, plural placement states including the alignment errors with respect to the reference placement state). As the known refractive index distribution, an appropriate refractive index distribution or an ideal refractive index distribution having no refractive index difference (that is, having an even refractive index) may be assumed. The object having such a known (specific) refractive index distribution is referred to as "a reference object". The reference object also has a known shape that is the same shape as that of the object 140.

The refractive index distribution of the reference object may be a designed value, or may be a measured value. The simulated wavefront $W_{sim}$ also corresponds to a transmitted wavefront of the reference object. A simulated wavefront $W_{sim}$ at a certain point (x, y) in the reference object is expressed by the following expression (7):

$$W_{simWater}(x,y) = OP_{simWater}(x,y) - OP_{simWater}(0,0)$$

$$W_{simOil}(x,y) = OP_{simOil}(x,y) - OP_{simOil}(0,0)$$

$$OP_{simWater}(x,y) = L1(x,y) + L2(x,y)N_{water} + L3(x,y)Ng + L4(x,y)N_{Water} + L5(x,y)$$

$$OP_{simOil}(x,y) = L1(x,y) + L2(x,y)N_{Oil} + L3(x,y)Ng + L4(x,y)N_{oil} + L5(x,y) \quad (7)$$

As for the expression (7), although it is essentially necessary to calculate the simulated wavefront $W_{sim}$ of the reference object for each of the plural placement states in each of the cases where the water and the oil are used as the medium, since the five placement states in each of the cases where the water and the oil are used as the medium can be explained by the same expression, the simulated wavefront $W_{sim}$ as a representative value in the case where the water is used as the medium and the simulated wavefront $W_{sim}$ as a representative value in the case where the oil is used as the medium are respectively referred to as "$W_{simWater}$" and "$W_{simOil}$". The simulated wavefront $W_{simWater}$ corresponds to a first reference transmitted wavefront, and the simulated wavefront $W_{simOil}$ corresponds to a second reference transmitted wavefront.

Figures 3A, 3B:
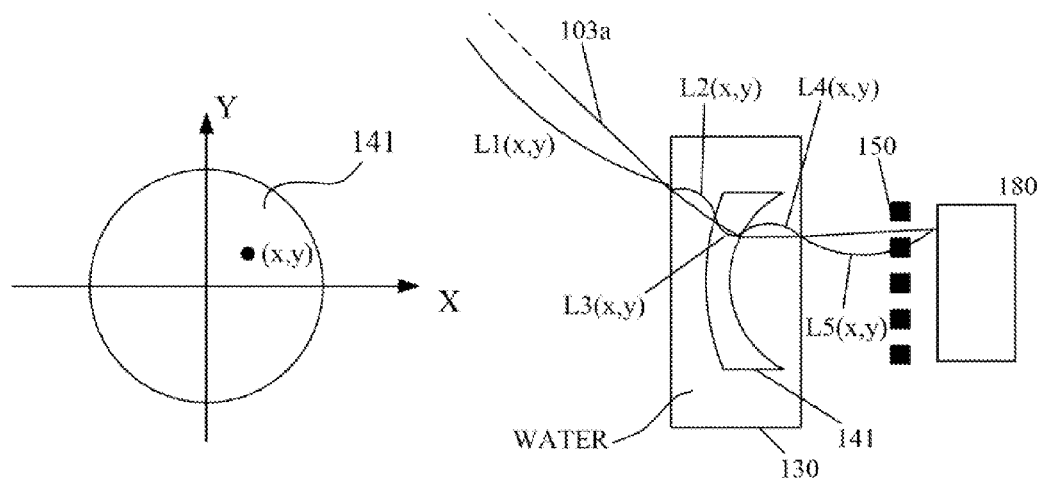
FIGS. 3A and 3B show an optical path in the measuring apparatus of Embodiment 1.

In the expression (7), L1-L5 represent geometric distances among surfaces of the above-described elements along a light ray 103a passing through a point (x, y) in the reference object 141 shown in FIG. 3A and reaching the CCD sensor 180 as shown in FIG. 3B. FIG. 3B shows the case where the medium is the water. $N_{Water}$ represents a refractive index of the water, and $N_{oil}$ represents a refractive index of the oil. Ng represents the known refractive index of the reference object 141.

That is, the reference object 141 corresponds to the object 140 whose refractive index distribution is replaced by the known refractive index distribution. For simplifying the expression, a thickness of a wall of the liquid tank 130 is ignored.

At step S70, the calculating part 200 calculates a difference wavefront $W_{water}$ that is a transmitted wavefront (wavefront aberration) corresponding to a difference value between the measured transmitted wavefront $W_{mwater}$ of the object 140 and the simulated wavefront $W_{simwater}$ of the reference object 141 in the case where the medium is the water.

The measured transmitted wavefront $W_{mwater}$ of the object 140 includes (1) the refractive index distribution of the object 140, (2) an influence of the shape of the object 140, (3) an influence of a shape error of the object 140 and (4) an offset due to a measuring system of this apparatus. The simulated wavefront $W_{simwater}$ of the reference object 141 includes, of the above-mentioned four items, (2) the influence of the shape of the object 140 and (4) the offset due to the measuring system of this apparatus. Therefore, the calculation of the difference between the measured transmitted wavefront $W_{mwater}$ of the object 140 and the simulated wavefront $W_{simwater}$ of the reference object 141 enables calculation of (1) the refractive index distribution of the object 140 and (3) the influence of the shape error of the object 140 as the difference wavefront $W_{water}$.

Moreover, the calculating part 200 similarly calculates a difference wavefront $W_{Oil}$ that is a transmitted wavefront (wavefront aberration) corresponding to a difference value between the measured transmitted wavefront $W_{mOil}$ of the object 140 and the simulated wavefront $W_{simOil}$ of the reference object 141 in the case where the medium is the oil.

A detailed description will be made of the calculation at step S70 by using expressions. The transmitted wavefronts $W_{mWater}$ and $W_{mOil}$ measured at steps S30 and S40 are expressed by the following expression (8) as well as the simulated wavefronts $W_{simWater}$ and $W_{simOil}$ expressed by the expression (7):

$$W_{mWater}(x,y)=OP_{mWater}(x,y)-OP_{mWater}(0,0)$$

$$W_{mOil}(x,y)=OP_{mOil}(x,y)-OP_{mOil}(0,0)$$

$$OP_{mWater}(x,y)=L1(x,y)+L2(x,y)N_{Water}+\{L3(x,y)+dL\}N_{ave}(x,y)+\{L4(x,y)-dL\}N_{Water}+L5(x,y)$$

$$OP_{mOil}(x,y)=L1(x,y)+L2(x,y)N_{Oil}+\{L3(x,y)+dL\}N_{ave}(x,y)+\{L4(x,y)-dL\}N_{Oil}+L5(x,y) \quad (8)$$

where $N_{ave}(x,y)$ represents a refractive index distribution projected value of the object 140 at coordinates (x,y), the projected value being averaged in a direction of the optical path, and dL represents a thickness error (shape component) of the object 140 at the coordinates (x,y).

The difference wavefronts $W_{Water}$ and $W_{Oil}$ each being a difference value between the measured transmitted wavefront $W_m$ and the simulated wavefront $W_{sim}$ are expressed by the following expression (9) where the refractive index Ng is equal to a central refractive index N(0,0) of the object 140 to simplify the expression:

$$W_{Water}=W_{mWater}-W_{simWater}=L3(x,y)\{N_{ave}(x,y)-Ng\}+dL(x,y)\{N_{ave}(x,y)-N_{Water}\}-dL(0,0)\{Ng-N_{water}\}$$

$$W_{Oil}=W_{mOil}-W_{simOil}=L3(x,y)\{N_{ave}(x,y)-Ng\}+dL(x,y)\{N_{ave}(x,y)-N_{Oil}\}-dL(0,0)\{Ng-N_{Oil}\} \quad (9)$$

Next, at step S80, the calculating part 200 calculates the refractive index distribution projected value $N_{ave}(x,y)$ of the object 140 from which the shape component dL of the object 140 is removed, by the following expression (10) using the difference wavefront $W_{Water}$, the difference wavefront $W_{Oil}$ and approximation shown by the following expression (11). This step S80 and step S90 described later correspond to a refractive index distribution calculating step.

$$N_{ave}(x,y)=Ng+\frac{1}{L3(x,y)}\times\frac{(Ng-N_{Water})W_{Oil}-(Ng-N_{Oil})W_{Water}}{N_{Oil}-N_{Water}} \quad (10)$$

$$\{N_{ave}(x,y)-Ng\}dL(x,y)\approx 0 \quad (11)$$

The above-described calculation provides the refractive index distribution projected value $N_{ave}(x,y)$ of the object 140 in each of the five placement states of the object 140.

At final step S90, the calculating part 200 calculates a three-dimensional refractive index distribution from the plural refractive index distribution projected values $N_{ave}(x,y)$ obtained at step S80. The calculation of the three-dimensional refractive index distribution can be made by deciding coefficients of a polynomial which expresses a three-dimensional refractive index distribution so as to reproduce the plural refractive index distribution projected values $N_{ave}(x,y)$ acquired above. Examples thereof will be shown below.

When the light (convergent light) 103 entering the object 140 is shown by 100 light rays, the refractive index distribution projected value $N_{ave}$ can be expressed by the following expression (12):

$$Nave_1=\begin{pmatrix}n_1\\\vdots\\n_{100}\end{pmatrix}, Nave_2=\begin{pmatrix}n_{101}\\\vdots\\n_{200}\end{pmatrix}, Nave_3=\begin{pmatrix}n_{201}\\\vdots\\n_{300}\end{pmatrix},$$

$$Nave_4=\begin{pmatrix}n_{301}\\\vdots\\n_{400}\end{pmatrix}, Nave_5=\begin{pmatrix}n_{401}\\\vdots\\n_{500}\end{pmatrix}$$

$$Nave=\begin{pmatrix}Nave_1\\Nave_2\\Nave_3\\Nave_4\\Nave_5\end{pmatrix} \quad (12)$$

where $N_{ave1}$ to $N_{ave5}$ represent refractive index distribution projected values at five decentering positions in the five placement states. Moreover, the three dimension refractive index distribution P to be calculated is expressed by twelve coefficients of a polynomial which are defined by the following expression (13):

$$1: p_1, r^2: p_2, r^4: p_3, r^6: p_4,$$
$$z: p_5, zr^2: p_6, zr^4: p_7, zr^6: p_8,$$
$$z^2: p_9, z^2r^2: p_{10}, z^2r^4: p_{11}, z^2r^6: p_{12}$$ (13)

$$P = \begin{pmatrix} p_1 \\ \vdots \\ p_{12} \end{pmatrix}$$

The refractive index distribution projected value V when each of the coefficients of the polynomial defined by the expression (13) is a unit amount can be expressed by the following expression (14):

$$V = \begin{pmatrix} v_{1,1} & \cdots & v_{12,1} \\ \vdots & & \vdots \\ v_{1,500} & \cdots & v_{12,500} \end{pmatrix}$$ (14)

In the three-dimensional refractive index distribution P calculated so as to satisfy the following equation (15), the coefficients of P reproduce the above plural refractive index distribution projected values.

$$N_{ave} = VP$$ (15)

When, for example, the least-square method is used to calculate P from the expression (15), each coefficient of P can be decided such that $\phi^2$ may become minimum, $\phi$ being defined as shown by the following expression (16):

$$\phi = VP - N_{ave}$$ (16)

On the other hand, when the eigenvalue decomposition method is used to calculate P, P can be directly acquired as shown by the following expression (17) by calculating $V^{-1}$.

$$P = V^{-1} N_{ave}$$ (17)

Furthermore, the combination of the least-square method and the eigenvalue decomposition method may be used such that, for example, $\phi^2$ may become minimum, $\phi$ being defined as shown by the following expression (18):

$$\phi = P - V^{-1} N_{ave}$$ (18)

The method for calculating P is not limited to the above-described methods, and may be any of generally known methods.

After the three-dimensional refractive index distribution P of the object 140 is calculated as described above, the process for measuring (calculating) the refractive index distribution in this embodiment is ended.

As described above, this embodiment causes the reference light to enter the object placed in the first medium having the first refractive index different from the refractive index of the object to measure the first transmitted wavefront of the object, and causes the reference light to enter the object placed in the second medium having the second refractive index different from the first refractive index and the refractive index of the object to measure the second transmitted wavefront of the object. This embodiment performs these measurements in each of the plural placement states of the object. Then, this embodiment calculates the alignment errors of the object by using the first and second transmitted wavefronts and the aberration sensitivities of the object measured in all the placement states.

In addition, this embodiment calculates (simulates) the first reference transmitted wavefront and the second reference transmitted wavefront respectively acquirable in the cases where the reference object having the known shape and the known refractive index distribution is placed in the placement states including the alignment errors in the first medium and in the second medium. Then, this embodiment calculates the refractive index distribution projected value of the object from the difference between the first and second transmitted wavefronts and the first and second reference transmitted wavefronts in the plural placement states, and calculates the coefficients of the polynomial that expresses the three-dimensional refractive index distribution so as to reproduce the refractive index distribution projected values in the plural placement states.

Thereby, this embodiment can calculate the alignment errors and reflect the calculated alignment errors in the calculation of the refractive index distribution even when the object has a complex shape and the alignment errors of the object are large, which makes it possible to measure the internal refractive index distribution of the object with high accuracy, without readjusting the placement state to correct the alignment error.

As in this embodiment, using a Talbot interferometer for measuring a transmitted wavefront enables measurement of a large aberration generated due to a refractive index difference between an object and a medium. The Talbot interferometer is one of lateral shearing interferometers, and measures a difference between an original transmitted wavefront and a sheared transmitted wavefront obtained by laterally shifting (shearing) the original transmitted wavefront, as interference fringes. Thus, shearing interferometers are interferometers for measuring an amount corresponding to a gradient (slope) of a wavefront shape of a transmitted wavefront.

The shearing amount of the transmitted wavefront is referred to as "a shear amount". Reducing the shear amount makes it possible to measure a large transmitted wavefront aberration as a small aberration (shear wavefront) that does not thicken the interference fringes.

In the shearing interferometer, an excessively small shear amount generally causes the shear wavefront to be buried in noises, which deteriorates measurement accuracy. Therefore, the shear amount is commonly desirable to be about 3-5% of a pupil diameter. However, in this embodiment, in order to measure a transmitted wavefront including a large aberration as a small shear wavefront, the shear amount is desirably reduced to about 1.5% or less of the pupil diameter, and more desirably reduced to about 0.4-0.9% thereof.

The shear amount "shear" is defined by the following expression (19) using the Talbot distance Z and a diameter D of the interference fringe data on the CCD sensor 180:

$$\text{shear} = \frac{\lambda Z}{dD}$$ (19)

The expression (19) can be also expressed as the following expression (20) by using the expression (2) and a diameter $D_0$ of a light flux on the orthogonal diffraction grating 170:

$$\text{shear} = \frac{md}{D_0}$$ (20)

As understood from the expression (20), the shear amount is proportional to the grating pitch d of the orthogonal diffraction grating 170. As understood from the expression (2), the grating pitch d of the orthogonal diffraction grating 170 gives an influence to the Talbot distance Z, so that it is necessary to decide the grating pitch d in consideration of interference between the elements in the apparatus. If, for example, m=1 and $D_0$ is about 10-20 mm, the grating pitch d is desirable to be about 40-180 μm.

Although this embodiment has described the case where the two media are the water and the oil, the two media are not limited thereto as long as their refractive index difference is about 0.01 or more. Moreover, the two media having refractive indices higher than that of the object may be used. Furthermore, the two media may be formed of same materials having mutually different refractive indices due to their temperature difference.

Moreover, although this embodiment has described the case where the Talbot interferometer is used as the wavefront sensor, other shearing interferometers such as other lateral shearing interferometers and radial shearing interferometers may be used.

In addition, although this embodiment has described the method for measuring the three-dimensional refractive index distribution, a refractive index distribution projected value expressed by the expression (10) may be regarded as the refractive index distribution when evaluating only influences after the reference light passes through the object. When the refractive index distribution projected value is regarded as the refractive index distribution, the expression (10) can be transformed such that $W_{Refractive\ index}$ expressed by the following expression (21) may be regarded as the refractive index distribution:

$$W_{Reactive\ index} = (Nave(x, y) - Ng) \times L3(x, y) = \frac{(Ng - N_{Water})W_{Oil} - (Ng - N_{Oil})W_{Water}}{N_{Oil} - N_{Water}} \quad (21)$$

The reason why $W_{Refractive\ index}$ can be regarded as the refractive index distribution is that a relationship between the refractive index projected value $N_{ave}$ and $W_{Refractive\ index}$ is established by known physical amounts. Moreover, $W_{Refractive\ index}$ has a length dimension, so that it can be also called a wavefront aberration that expresses influences of the refractive index distribution. Therefore, the refractive index distribution measuring method shown in this embodiment includes various methods from a method for measuring a refractive index that is a dimensionless value to a method for measuring a wavefront aberration that expresses the influences of the refractive index distribution.

Embodiment 2

Description will hereinafter be made of a refractive index distribution measuring apparatus that is a second embodiment (Embodiment 2) of the present invention with reference to FIG. 4. Although Embodiment 1 performs the measurement of the transmitted wavefronts in the states where the object is placed in the two media having mutually different refractive indices, Embodiment 2 performs measurement of transmitted wavefronts in states where an object is placed in a same medium, but two light sources (first reference light and second reference light) having mutually different wavelengths are used.

Figure 4:
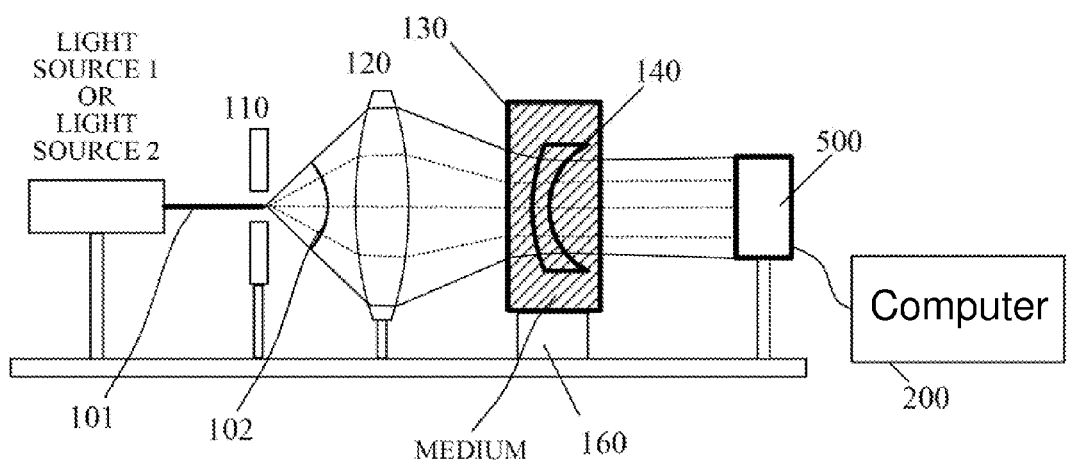
FIG. 4 shows the configuration of a refractive index distribution measuring apparatus that is Embodiment 2 of the present invention.

A refractive index distribution measuring apparatus shown in FIG. 4 uses a light source 1 (first light source) that is a He—Ne laser (wavelength 633 nm) and a light source 2 (second light source) that emits a second harmonic (wavelength 532 nm) of a YAG laser. The medium in which the object 140 is placed may be, though detailed description will be made below, a medium having a refractive index lower than that of the object 140 and higher than that of air. For example, the medium may be water or low-refractive index oil having a refractive index of about 1.5 to 1.8.

Figure 5:
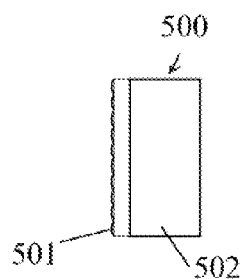
FIG. 5 shows a Shack-Hartmann sensor used in the measuring apparatus of Embodiment 2.

A pinhole 110 generates first reference light from laser light emitted by the light source 1, and generates second reference light from laser light emitted by the light source 2, each of the first reference light and the second reference light having a wavefront as an ideal spherical wave. Each of the first reference light and the second reference light passes through a collimator lens 120 and an object 140 placed in a liquid tank 130 filled with the medium, and its transmitted wavefront is measured by a Shack-Hartmann sensor 500 that is a wavefront sensor. The Shack-Hartmann sensor 500 is constituted by a lens array 501 and a CCD sensor 502 as shown in FIG. 5.

As well as in Embodiment 1, the collimator lens 120, the liquid tank 130 (object 140) and the Shack-Hartmann sensor 500 are movable on a rail (not shown) extending in an optical axis direction. Moving these measuring optical elements along the rail makes it possible to change the reference light entering the object 140 into any of divergent light, collimated light and convergent light, which enables adjustment of a numerical aperture (NA) of the reference light entering the Shack-Hartmann sensor 500.

The use of the Shack-Hartmann sensor requires tighter control of the NA of the reference light entering thereinto as compared with the use of the Talbot interferometer described in Embodiment 1. However, the use of the Shack-Hartmann sensor can eliminate adjustment of a distance between the diffraction grating and the CCD sensor constituting the Talbot interferometer to the Talbot distance, which makes it easy to adjust the position of the sensor.

The Shack-Hartmann sensor 500 has a function of converging the reference light entering the lens array 501 on the CCD sensor 502. A tilted transmitted wavefront entering the lens array 501 shifts the converging position of the reference light. The Shack-Hartmann sensor 500 can measure the tilt of the transmitted wavefront by converting it into the shift of the converging position of the reference light, and therefore can measure a wavefront including a large aberration.

Moreover, the apparatus of this embodiment is also provided with the parallel decentering mechanism 160 that moves the object 140 in the optical axis direction and directions orthogonal to the optical axis direction.

Next, description will be made of a refractive index distribution measuring procedure in this embodiment with reference to FIG. 6. This measuring procedure is executed by a calculating part 200 shown in FIG. 4 according to a computer program. The calculating part 200 serves as a transmitted wavefront measuring part, a reference transmitted wavefront calculating part, an alignment error calculating part and a refractive index distribution calculating part.

Figure 6:
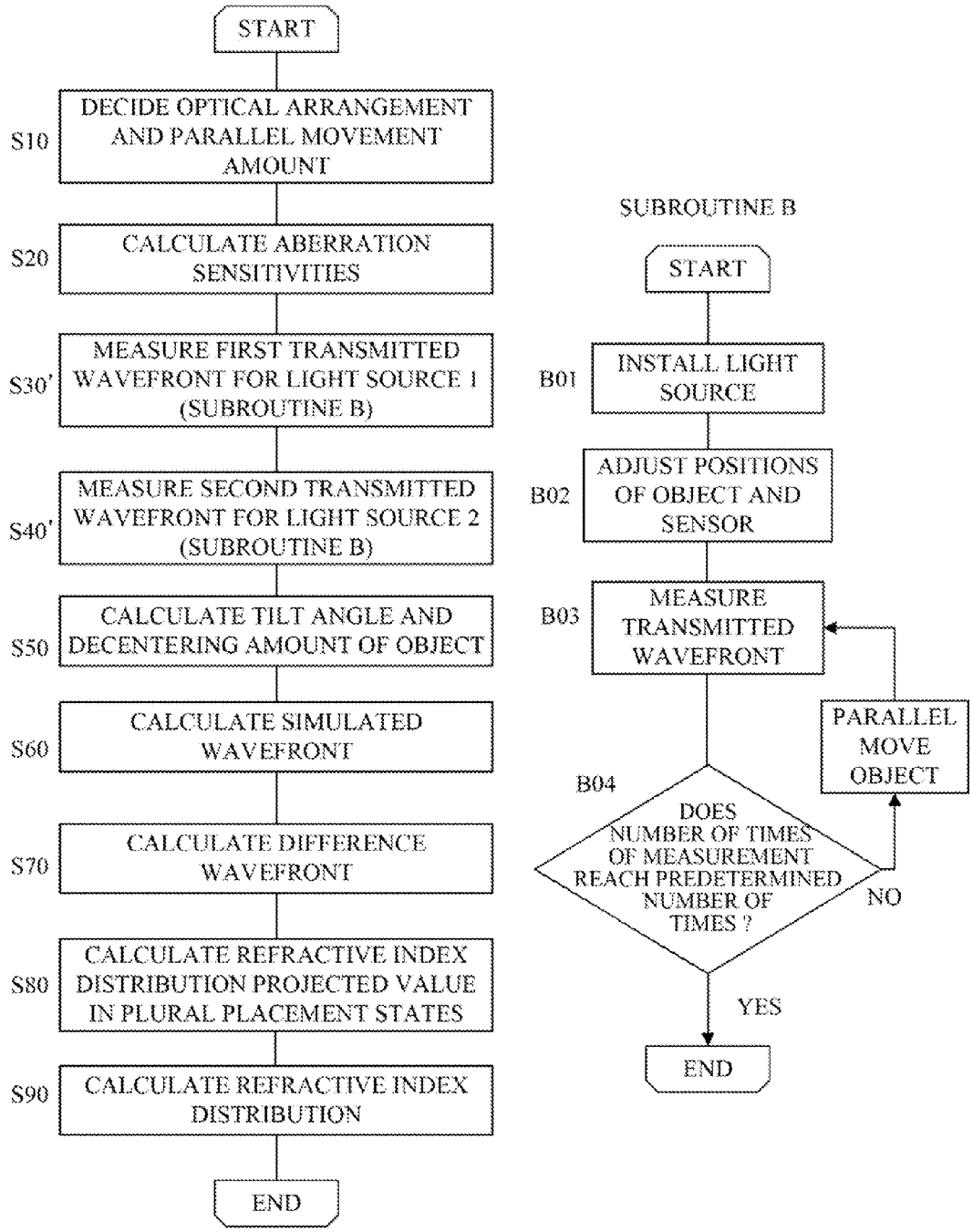
FIG. 6 is a flowchart showing an internal refractive index distribution measuring procedure in Embodiment 2.

Steps S10, S20 and S50 to S90 shown in FIG. 6 are same as those described in Embodiment 1 (FIG. 2), and therefore steps S30' and S40' in FIG. 6 different from steps S30 and S40 in Embodiment 1 will be mainly described here.

At step S30', the calculating part 200 executes a subroutine B. The subroutine B includes the following four steps B01 to B04. Firstly, at step B01, the calculating part 200 drives a light source moving mechanism (not shown) to install the light source 1 to a predetermined light source position.

Next, at step B02, the calculating part 200 adjusts the positions of the object 140 and the Shack-Hartmann sensor 500. Then, at step B03, the calculating part 200 causes the first reference light emitted from the light source 1 to enter the object 140, which is placed in the medium in the liquid tank 130, through the pinhole 110 to measure the transmitted wavefront.

At step B04, the calculating part 200 drives the parallel decentering mechanism 160 to move the object 140 in four directions orthogonal to the optical axis direction by S (that is, to four placement states) until the number of times of the measurements increases to a predetermined number of times (five in this embodiment). The calculating part 200 thus measures the transmitted wavefront (first transmitted wavefront) W1 of the object 140 in each of the five placement states.

Next, at step S40', the calculating part 200 drives the light source moving mechanism to install the light source 2, instead of the light source 1, to the predetermined light source position, and then executes the subroutine B to measure the transmitted wavefront (second transmitted wavefront) W2 in each of the five placement states.

Thereafter, the calculating part 200 performs steps S50 to S90 to calculate the refractive index distribution of the object 140 as well as in Embodiment 1. However, step S70 provides a difference wavefront expressed by the following expressions (22):

$$W1 = L3(x,y)\{Nave_{HeNe}(x,y) - Ng_{HeNe}\} + dL(x,y)\{Nave_{HeNe}(x,y) - N_{oilHeNe}\} - dL(0,0)\{Ng_{HeNe} - N_{oilHeNe}\}$$

$$W2 = L3(x,y)\{Nave_{YAG}(x,y) - Ng_{YAG}\} + dL(x,y)\{Nave_{YAG}(x,y) - N_{oilYAG}\} - dL(0,0)\{Ng_{YAG} - N_{oilYAG}\} \quad (22)$$

In the expressions (22), $Nave_{HeNe}(x,y)$ and $Nave_{YAG}(x,y)$ respectively represent refractive index projected values at a certain position (x,y) in the object 140 for the light source 1 (He—Ne laser) and the light source 2 (YAG laser second harmonic). $Ng_{HeNe}$ and $Ng_{YAG}$ respectively represent ideal refractive indices (reference refractive indices) of the object 140 for the light source 1 and the light source 2.

Moreover, $N_{oilHeNe}$ and $N_{oilYAG}$ respectively represent refractive indices of the medium for the light source 1 and the light source 2. In addition, the refractive indices for the light sources 1 and 2 have an approximation relationship shown by the following expression (23):

$$Nave_{YAG}(x, y) = \frac{Ng_{YAG} - 1}{Ng_{HeNe} - 1} Nave_{HeNe}(x, y) \quad (23)$$

At step S80, the calculating part 200 calculates a refractive index projected value expressed by the following expression (24):

$$Nave_{HeNe}(x, y) = Ng_{HeNe} + \frac{1}{L3(x, y)} \times \frac{(Ng_{HeNe} - N_{oilHeNe})W2 - (Ng_{YAG} - N_{oilYAG})W1}{\frac{Ng_{YAG} - 1}{Ng_{HeNe} - 1}(Ng_{HeNe} - N_{oilHeNe}) - (Ng_{YAG} - N_{oilYAG})} \quad (24)$$

This embodiment provides an effect of substantially measuring the object 140 in two media by changing the wavelength of the light source. Therefore, the expressions (23) and (24) respectively have the same meanings as the expressions (9) and (10) shown in Embodiment 1.

As understood from the expression (24), when a value of $\Psi$ expressed by the following expression (25) is large, errors of the measured transmitted wavefront W1 and W2 can be reduced.

$$\Psi = \frac{Ng_{YAG} - 1}{Ng_{HeNe} - 1}(Ng_{HeNe} - N_{oilHeNe}) - (Ng_{YAG} - N_{oilYAG}) \quad (25)$$

For example, in a case where the medium is air, $N_{oil}$ is not 1, and therefore the value of $\Psi$ is not 0, which makes it impossible to perform the measurement. On the other hand, for example, in a case where the refractive index distribution of the object can be regarded as not being significantly changed depending on the wavelength, since $Ng_{YAG}$ is not equal to $Ng_{HeNe}$, the expression (25) can be expressed by the following expression (26):

$$\Psi = N_{oilYAG} - N_{oilHeNe} \quad (26)$$

In this case, it is desirable to use a medium whose refractive indices for the light sources 1 and 2 have a large difference. As described above, in order to increase the value of $\Psi$, it is necessary to decide the medium in also consideration of the refractive index of the object.

As described above, this embodiment causes the first reference light to enter the object placed in the medium having the refractive index different from that of the object to measure the first transmitted wavefront of the object, and causes the second reference light to enter the object placed in the same medium to measure the second transmitted wavefront of the object. This embodiment performs these measurements in each of the plural placement states of the object. Then, this embodiment calculates the alignment errors of the object by using the first and second transmitted wavefronts and the aberration sensitivities of the object measured in all the placement states.

In addition, this embodiment calculates (simulates) the first reference transmitted wavefront and the second reference transmitted wavefront respectively acquirable in the cases where the first reference light and the second reference light enter the reference object having the known shape and the known refractive index distribution and being placed in the placement states including the alignment errors in the medium. Then, this embodiment calculates the refractive index distribution projected value of the object from the difference between the first and second transmitted wavefronts and the first and second reference transmitted wavefronts in the plural placement states, and calculates the coefficients of the polynomial that expresses the three-dimensional refractive index distribution so as to reproduce the refractive index distribution projected values in the plural placement states.

Thereby, this embodiment can calculate the alignment errors and reflect the calculated alignment errors in the calculation of the refractive index distribution even when the object has a complex shape and the alignment errors of the object are large, which makes it possible to measure the internal refractive index distribution of the object with high accuracy, without readjusting the placement state to correct the alignment error.

It is only necessary for the measuring apparatus of this embodiment to be capable of measuring an amount corresponding to a gradient of a wavefront shape of the transmitted wavefront or a slope of a light ray, that is, to be capable of detecting the gradient or the slope as a measurable physical value in a case where the transmitted wavefront includes a large aberration. Thus, instead of the measuring apparatus using the above-described Shack-Hartmann method, measuring apparatuses using a Hartmann method and a Ronchi test may be used.

Embodiment 3

Figure 7:
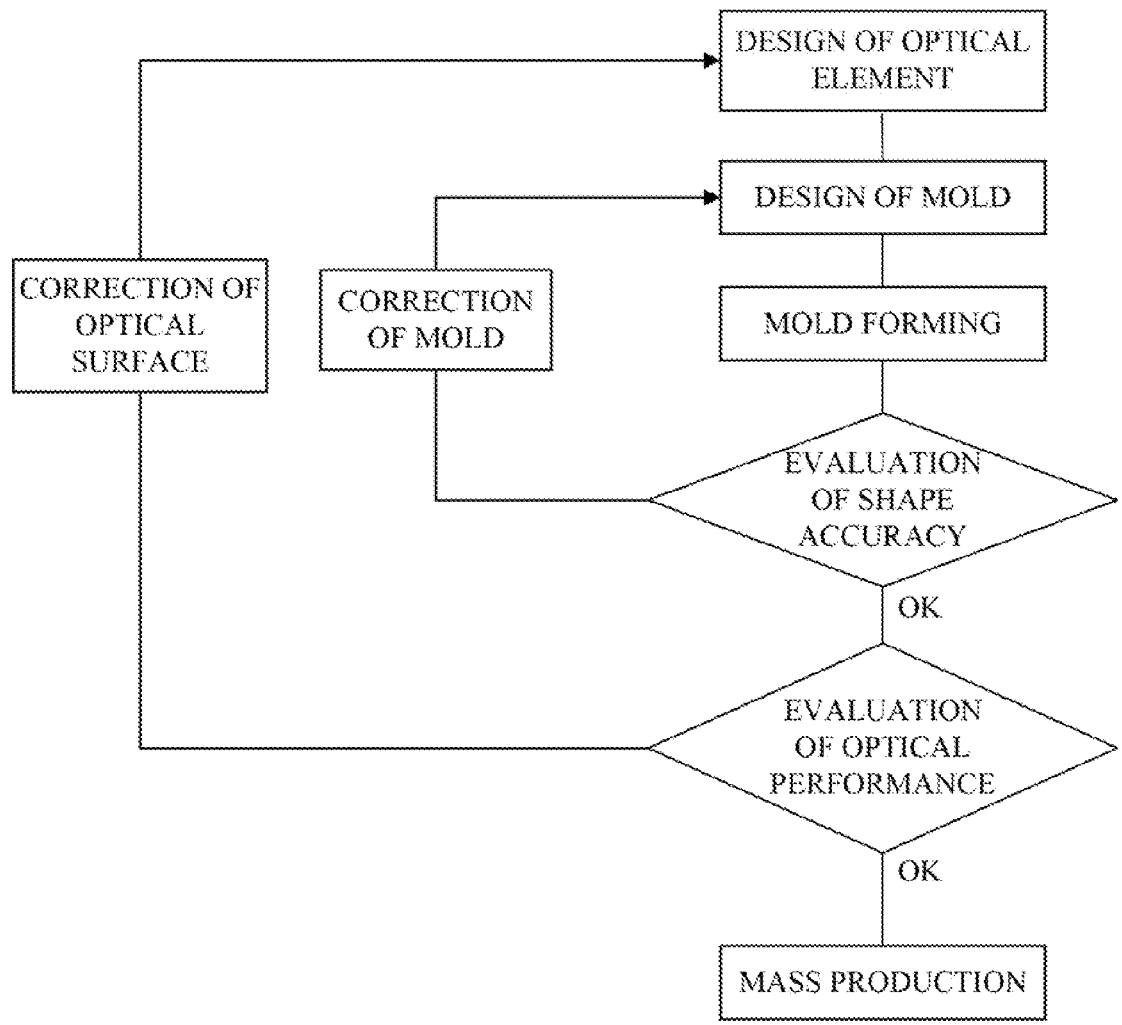
FIG. 7 is a flowchart showing processes for producing an optical element by using a refractive index distribution measured by the measuring apparatus of each of Embodiments 1 and 2.

It is possible to feed back the measurement result of the refractive index distribution acquired by the measuring apparatus (or the measuring method) of each of Embodiments 1 and 2 to a method for producing optical elements such as lenses. FIG. 7 shows an example of the method for producing the optical element using mold forming.

The optical element is produced through a process of designing the optical element, a process of designing a mold and a mold forming process of forming the optical element by using the mold. The formed optical element is evaluated for shape accuracy. If the shape accuracy is deficient, the mold is corrected and then the mold forming process is performed again. If the shape accuracy is sufficient, the optical element is evaluated for optical performance.

Incorporating the refractive index distribution measuring procedure described using FIGS. 2 and 6 in this optical performance evaluating process enables mass production of the optical element formed of a high refractive index glass material. If the optical performance is deficient, the optical element whose optical surface is corrected is redesigned.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-270214, filed on Dec. 3, 2010, which is hereby incorporated by reference herein in its entirety.

What is claimed is:

1. A refractive index distribution measuring method of measuring a refractive index distribution of an object using a first medium having a first refractive index and a second medium having a second refractive index, the first and second refractive indices being different from each other and from a refractive index of the object, the method comprising:

a transmitted wavefront measuring step of causing a reference light to enter the object placed in the first medium to measure a first transmitted wavefront of the object, and of causing the reference light to enter the object placed in the second medium to measure a second transmitted wavefront of the object;

a reference transmitted wavefront calculating step of calculating a first reference transmitted wavefront of a reference object acquirable when causing the reference light to enter the reference object placed in the first medium, the reference object having a known shape and a known refractive index distribution, and of calculating a second reference transmitted wavefront of the reference object acquirable when causing the reference light to enter the reference object placed in the second medium;

a refractive index distribution calculating step of calculating the refractive index distribution from which a shape component of the object is removed, using the first and second transmitted wavefronts and the first and second reference transmitted wavefronts, wherein the transmitted wavefront measuring step measures the first transmitted wavefronts by causing the reference light to enter the object placed in plural placement states in the first medium, and measures the second transmitted wavefronts by causing the reference light to enter the object placed in the plural placement states in the second medium; and an alignment error calculating step of calculating an aberration sensitivity with respect to changes of the placement state of the object, and of calculating an alignment error of the object in each of the plural placement states in the measurements of the first and second transmitted wavefronts, using the aberration sensitivity and the first and second transmitted wavefronts measured in the plural placement states, wherein the reference transmitted wavefront calculating step calculates the first and second reference transmitted wavefronts respectively acquirable when causing the reference light to enter the reference object placed in placement states including the alignment errors in the first medium and the second medium.

2. A refractive index distribution measuring method according to claim 1, wherein the alignment error calculating step calculates the alignment error by separating the shape component of the object from the alignment error using the first and second transmitted wavefronts and the first and second reference transmitted wavefronts.

3. A refractive index distribution measuring apparatus configured to measure a refractive index distribution of an object using a first medium having a first refractive index and a second medium having a second refractive index, the first and second refractive indices being different from each other and from that of the object, the apparatus comprising:

a transmitted wavefront measuring part, comprising a light source, a pinhole, and image pickup element, and an object case, configured to cause a reference light to enter the object placed in the first medium to measure a first transmitted wavefront of the object, and configured to cause the reference light to enter the object placed in the second medium to measure a second transmitted wavefront of the object;

a reference transmitted wavefront calculating part configured to calculate a first reference transmitted wavefront of a reference object acquirable when causing the reference light to enter the reference object placed in the first medium, the reference object having a known shape and a known refractive index distribution, and configured to calculate a second reference transmitted wavefront of the reference object acquirable when causing the reference light to enter the reference object placed in the second medium;

a refractive index distribution calculating part configured to calculate the refractive index distribution from which a shape component of the object is removed, using the first and second transmitted wavefronts and the first and second reference transmitted wavefronts, wherein the transmitted wavefront measuring part is configured to measure the first transmitted wavefront by causing the reference light to enter the object placed in plural placement states in the first medium, and measure the second transmitted wavefront by causing the reference light to enter the object placed in the plural placement states in the second medium; and an alignment error calculating part configured to calculate an aberration sensitivity with respect to changes of the placement state of the object, and configured to calculate an alignment error of the object in each of the plural placement states in the measurements of the first and second transmitted wavefronts, using the aberration sensitivity and the first and second transmitted wavefronts measured in the plural placement states, wherein the reference transmitted wavefront calculating part is configured to calculate the first and second reference transmitted wavefronts respectively acquirable when causing the reference light to enter the reference object placed in placement states including the alignment errors in the first medium and the second medium.

4. A method of producing an optical element, the method comprising the steps of:

performing mold forming of the optical element; and
measuring a refractive index distribution of the optical element, which is an object, using a refractive index distribution measuring method;
evaluating the optical element using the measured refractive index distribution,
wherein the refractive index distribution measuring method measures the refractive index distribution of the object using a first medium having a first refractive index and a second medium having a second refractive index, the first and second refractive indices being different from each other and from a refractive index of the object, and
wherein the refractive index distribution measuring method comprises:
a transmitted wavefront measuring step of causing a reference light to enter the object placed in the first medium to measure a first transmitted wavefront of the object, and of causing the reference light to enter the object placed in the second medium to measure a second transmitted wavefront of the object;
a reference transmitted wavefront calculating step of calculating a first reference transmitted wavefront of a reference object acquirable when causing the reference light to enter the reference object placed in the first medium, the reference object having a known shape and a known refractive index distribution, and of calculating a second reference transmitted wavefront of the reference object acquirable when causing the reference light to enter the reference object placed in the second medium; and
a refractive index distribution calculating step of calculating the refractive index distribution from which a shape component of the object is removed, using the first and second transmitted wavefronts and the first and second reference transmitted wavefronts,
wherein the transmitted wavefront measuring step measures the first transmitted wavefronts by causing the reference light to enter the object placed in plural placement states in the first medium, and measures the second transmitted wavefronts by causing the reference light to enter the object placed in the plural placement states in the second medium; and
wherein the method further comprises an alignment error calculating step of calculating an aberration sensitivity with respect to changes of the placement state of the object, and of calculating an alignment error of the object in each of the plural placement states in the measurements of the first and second transmitted wavefronts, using the aberration sensitivity and the first and second transmitted wavefronts measured in the plural placement states, and
wherein the reference transmitted wavefront calculating step calculates the first and second reference transmitted wavefronts respectively acquirable when causing the reference light to enter the reference object placed in placement states including the alignment errors in the first medium and the second medium.

5. A refractive index distribution measuring method of measuring a refractive index distribution of an object using a medium having a refractive index different from that of the object, and using a first reference light and a second reference light having a wavelength different from that of the first reference light, the method comprising:
a transmitted wavefront measuring step of causing the first reference light to enter the object placed in the medium to measure a first transmitted wavefront of the object, and of causing the second reference light to enter the object placed in the medium to measure a second transmitted wavefront of the object;
a reference transmitted wavefront calculating step of calculating a first reference transmitted wavefront of a reference object acquirable when causing the first reference light to enter the reference object placed in the medium, the reference object having a known shape and a known refractive index distribution, and of calculating a second reference transmitted wavefront of the reference object acquirable when causing the second reference light to enter the reference object placed in the medium;
a refractive index distribution calculating step of calculating the refractive index distribution from which a shape component of the object is removed, using the first and second transmitted wavefronts and the first and second reference transmitted wavefronts,
wherein the transmitted wavefront measuring step measures the first transmitted wavefront by causing the first reference light to enter the object placed in plural placement states in the medium, and measures the second transmitted wavefront by causing the second reference light to enter the object placed in the plural placement states; and
an alignment error calculating step of calculating an aberration sensitivity with respect to changes of the placement state of the object, and of calculating an alignment error of the object in each of the plural placement states in the measurements of the first and second transmitted wavefronts, using the aberration sensitivity and the first and second transmitted wavefronts measured in the plural placement states,
wherein the reference transmitted wavefront calculating step calculates the first and second reference transmitted wavefronts respectively acquirable when causing the first reference light and the second reference light to enter the reference object placed in placement states including the alignment errors.

6. A refractive index distribution measuring method according to claim 5, wherein the alignment error calculating step calculates the alignment error by separating the shape component of the object from the alignment error using the first and second transmitted wavefronts and the first and second reference transmitted wavefronts.

7. A refractive index distribution measuring apparatus configured to measure a refractive index distribution of an object using a medium having a refractive index different from that of the object, and using a first reference light and a second reference light having a wavelength different from that of the first reference light, the apparatus comprising:
a transmitted wavefront measuring part, comprising a light source, a pinhole, and image pickup element, and an object case, configured to cause the first reference light to enter the object placed in the medium to measure a first transmitted wavefront of the object, and configured to cause the second reference light to enter the object placed in the medium to measure a second transmitted wavefront of the object;
a reference transmitted wavefront calculating part configured to calculate a first reference transmitted wavefront of a reference object acquirable when causing the first reference light to enter the reference object placed in the medium, the reference object having a known shape and a known refractive index distribution, and configured to calculate a second reference transmitted wavefront of the reference object acquirable when causing the second reference light to enter the reference object placed in the medium;

a refractive index distribution calculating part configured to calculate the refractive index distribution from which a shape component of the object is removed, using the first and second transmitted wavefronts and the first and second reference transmitted wavefronts, wherein the transmitted wavefront measuring part is configured to measure the first transmitted wavefront by causing the first reference light to enter the object placed in plural placement states in the medium, and configured to measure the second transmitted wavefront by causing the second reference light to enter the object placed in the plural placement states and an alignment error calculating part configured to calculate an aberration sensitivity with respect to changes of the placement state of the object, and configured to calculate an alignment error of the object in each of the plural placement states in the measurements of the first and second transmitted wavefronts, using the aberration sensitivity and the first and second transmitted wavefronts measured in the plural placement states, wherein the reference transmitted wavefront calculating part is configured to calculate the first and second reference transmitted wavefronts respectively acquirable when causing the first reference light and the second reference light to enter the reference object placed in placement states including the alignment errors.

8. A method of producing an optical element, the method comprising the steps of:

performing mold forming of the optical element; and measuring a refractive index distribution of the optical element, which is an object, using a refractive index distribution measuring method; and evaluating the optical element using the measured refractive index distribution, wherein the refractive index distribution measuring method measures the refractive index distribution of the object using a medium having a refractive index different from that of the object, and using a first reference light and a second reference light having a wavelength different from that of the first reference light, wherein the refractive index distribution measuring method comprises:

a transmitted wavefront measuring step of causing the first reference light to enter the object placed in the medium to measure a first transmitted wavefront of the object, and of causing the second reference light to enter the object placed in the medium to measure a second transmitted wavefront of the object;

a reference transmitted wavefront calculating step of calculating a first reference transmitted wavefront of a reference object acquirable when causing the first reference light to enter the reference object placed in the medium, the reference object having a known shape and a known refractive index distribution, and of calculating a second reference transmitted wavefront of the reference object acquirable when causing the second reference light to enter the reference object placed in the medium; and a refractive index distribution calculating step of calculating the refractive index distribution from which a shape component of the object is removed, using the first and second transmitted wavefronts and the first and second reference transmitted wavefronts, wherein the transmitted wavefront measuring step measures the first transmitted wavefront by causing the first reference light to enter the object placed in plural placement states in the medium, and measures the second transmitted wavefront by causing the second reference light to enter the object placed in the plural placement states, wherein the method further comprises an alignment error calculating step of calculating an aberration sensitivity with respect to changes of the placement state of the object, and of calculating an alignment error of the object in each of the plural placement states in the measurements of the first and second transmitted wavefronts, using the aberration sensitivity and the first and second transmitted wavefronts measured in the plural placement states, and wherein the reference transmitted wavefront calculating step calculates the first and second reference transmitted wavefronts respectively acquirable when causing the first reference light and the second reference light to enter the reference object placed in placement states including the alignment errors.

* * * * *